June 21, 1949.  C. H. JENNINGS ET AL  2,473,887
PROTECTING METAL SURFACES DURING
SOLDERING AND BRAZING PROCESSES
Filed Dec. 29, 1945

WITNESSES:

INVENTORS
Charles H. Jennings and
Edward R. Gemberg
BY
ATTORNEY

Patented June 21, 1949

2,473,887

UNITED STATES PATENT OFFICE 2,473,887

PROTECTING METAL SURFACES DURING SOLDERING AND BRAZING PROCESSES

Charles H. Jennings, Forest Hills, and Edward R. Gamberg, Pittsburgh, Pa., assignors to Westinghouse Electric Corporation, East Pittsburgh, Pa., a corporation of Pennsylvania Application December 29, 1945, Serial No. 638,359

3 Claims. (Cl. 113—112)

This invention relates to processes for brazing and soldering and in particular to the control of the areas to be so treated.

One of the difficulties encountered in brazing and soldering has been the uncontrolled spread of the soldering or brazing metal whereby blemishing or deterioration of the member being soldered occurs. In some cases, the undesired spreading of the solder or brazing metal has resulted in damage to the work whereby the work must be scrapped. In many cases, the inadvertent spattering or spreading of solder or brazing metal often requires considerable handwork to remove such undesired metal.

While it has been proposed heretofore to confine brazing metals and solders within predetermined areas by means of dams or coatings of one kind or another, in actual practice no material is available to the trade today that has been satisfactory for this purpose. In many cases, the proposed materials require considerable treatment, such as drying or the like, in order to put them in a suitable condition for subsequent soldering to take place. Tests of numerous suggested materials have indicated that they all were easily burned away when subjected to the direct flame of a brazing torch. An oxidizing flame is often required in brazing copper and its alloys and numerous dam compositions are rapidly destroyed under these conditions. When parts are furnace brazed it has been found that no material available to the trade today is satisfactory.

An object of this invention is to provide a composition for confining or damming up solders and brazing metals of all kinds and fluxes to predetermined areas of the work being brazed and soldered.

A further object of this invention is to provide a process for brazing and soldering predetermined portions only of members.

A still further object of this invention is to provide for damming molten solders within predetermined areas in order to provide for selected purposes.

Other objects of the invention will in part be obvious and will in part appear hereinafter.

In order to secure a better understanding of the nature and objects of this invention, reference should be had to the following detailed description and drawing, in which.

Figure 1:
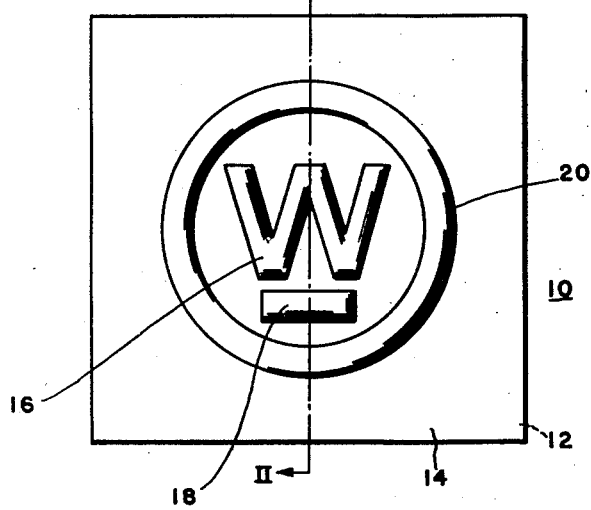
Figure 1 is a view in plan of a surface bearing a decorative marking.
Figure 2:
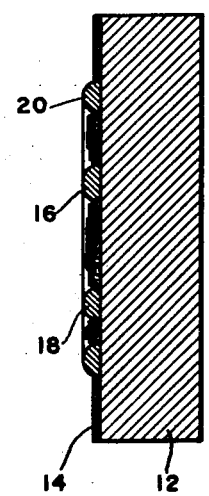
Fig. 2 is a cross section of Fig. 1 on line II—II.

We have discovered that the flow of solder, brazing metals and soldering fluxes may be controlled or confined to selected areas of members by applying to the surfaces of the members to be soldered a composition having as its essential ingredients a polymeric organosilicon oxide in combination with finely divided refractory inorganic substances in an amount equal to at least 25% of the weight of the organosilicon oxide and sufficient of a volatile solvent to render the composition fluid to facilitate easy application. The liquid composition is applied to the selected surface of the member from which the solder or brazing metal is to be prevented from adhering and upon the evaporation of the solvent a coating is obtained that adheres tightly to the two metal surfaces. This coating will be substantially dry and in most cases the soldering or brazing operation may be carried out at once. The coating composition will be found to be extremely resistant to both oxidizing or reducing flames from brazing torches as well as any conventional atmosphere employed in a brazing furnace. The coating composition may be applied in such a manner as to outline the areas within which the solder or brazing metal is to be dammed or it may be applied to the entire surface of the member other than the portions to be soldered or brazed.

Particularly valuable applications of the coating of this invention are for decorative and household appliance manufactures. Polished metal may be brazed or soldered without marring or injuring the surfaces except at the areas being brazed or soldered.

Numerous organosilicon oxide polymers have been found suitable for the practice of this invention. The general unit formula of the polymers is

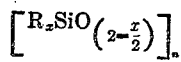

where $R_x$ may comprise alkyl, aryl, alkaryl, and other organic radicals and $x$ indicates a value from 1 to 2 or more but not above 3. The value of $x$ has been from 1 to 1.9 in many polymers employed successfully in the practice of the invention; however the value of $x$ may be more or less than this range of values. Typical organosilicon oxide polymers that have been employed are methyl silicones, phenyl methyl silicones, and phenyl ethyl silicones.

The organosilicon oxide polymers suitable for use for the practice of this invention are solvent soluble polymers where $n$ has an average value of about 10 as a lower limit. The degree of polymerization is not critical as long as coatings may be secured. The critical factor is that the organosilicon oxide polymers be of such molecular weight that they are relatively viscous, but still soluble in a volatile solvent such, for example, as acetone, naphtha, carbon tetrachloride, and benzene.

In preparing the composition for application to metals, one part by weight of the organic silicon oxide polymer may be dissolved in from 2 to 10 parts or more of a volatile solvent such for example as carbon tetrachloride and at least one-quarter part by weight of a finely divided refractory inorganic composition such, for example, as magnesia, talc, silica, titanium dioxide or asbestos. The finely divided refractory has been added in amounts as high as three to five times the amount of the polymer. A specific example of a composition of this type consisted of the following:

Example I 1 part by weight of a methyl silicone containing 1.8 methyl groups per silicon atom.
2 parts by weight of 250 mesh magnesium oxide.
5 parts by weight of carbon tetrachloride.

The composition so prepared was quite fluid and the magnesium oxide stayed in suspension quite well.

The composition of Example I was applied to the member of Fig. 1 where the base member 12 of brass was coated in such a manner over the upper surface thereof that a coating 14 of the composition was deposited, leaving an area corresponding to the letter W16, a bar 18 and a circle 20 uncoated. The uncoated areas were treated with a brazing flux composed of zinc chloride, ammonium chloride, stannic chloride, hydrochloric acid and water. The soldering flux wetted the brass only at the areas where the composition 14 was absent. Thereafter a brazing alloy composed of copper with 6% phosphorus was applied to the uncoated areas in a molten state by means of a brazing torch. The metal 12 was vigorously heated to a temperature of over 700° C. The molten brazing alloy formed semicircular cross sectional mounds approximately 3½ times as high as the thickness of the coating 14 without tending to run over. After the brazing alloy had cooled, the coating composition 14 was readily removed by brushing. It could be softened by applying thereto an aromatic type solvent. The decorative marking 16, 18, 20 shown in Fig. 1 was found to be durably brazed to the base member 12.

In another example, a fluid composition was prepared from

Example II 1 part by weight of phenyl methyl silicone containing approximately equal numbers of phenyl and methyl radicals per silicon atom,
1 part by weight of aluminum oxide and
6 parts of acetone.

The composition was applied to metal surfaces where it dried rapidly to produce a substantially tack-free coating that could be employed for soldering and brazing purposes at once. In brazing applications the coating gave good results.

Figure 3:
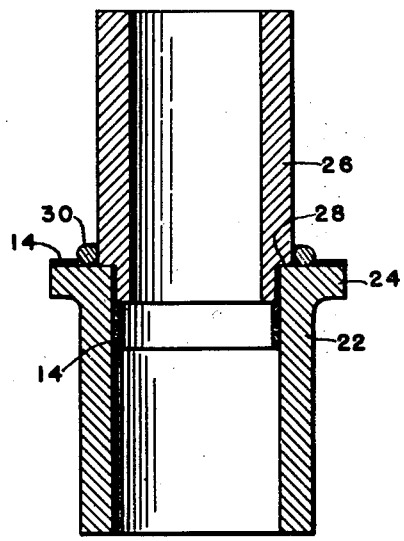
Fig. 3 is a vertical cross section of a part immediately preceding furnace brazing.

Referring to Fig. 3 of the drawing, there is illustrated an application of the invention to the brazing of two tubes. The tube 22 having the shoulder 24 is brazed to the tube 26 containing a smaller diameter terminal 28 fitting within the tube 22. The composition 14 is applied to the shoulder 24 to prevent the brazing solder from spreading unduly or running off the shoulder in case the tubes are tilted from the vertical. A thin band of the composition 14 is applied to the interior of the tube 22 adjacent the terminal 28 in order to prevent any of the brazing alloy from escaping or marring the interior surface of the tube 22. The member of Fig. 3 may be subjected to brazing temperatures within a brazing furnace having a suitable atmosphere prepared from combusted gas for this purpose. The members of Fig. 3 may be heated in a brazing furnace for two hours or more without any difficulty. A good joint will be found to have been effected without the brazing alloy having contaminated or marred any surface coated with the composition 14.

A further advantage of the organosilicon oxide coatings of this invention is that inadvertently splashed brazing metal will be prevented from adhering to the members being brazed, thereby eliminating difficult cleaning operations and the risk of spoiled work.

Soft soldering with lead and thin and similar solders may be controlled effectively by the application of the present invention. We have found that soldering or brazing with lead, lead tin, phosphorus copper, silver phosphorus copper, and silver solders may be advantageously controlled by employing the composition herein disclosed as a dam or confining means.

Brazing of composition coated members can be accomplished by use of a gas brazing flame, incandescent carbons, electronic heating, or dipping into a molten bath of brazing metal with good results.

The dried organosilicon oxide coatings after brazing or soldering or the like may be removed by wire brushing and suitable aromatic solvents, or both.

It will be found that the coating composition of this invention is not water soluble and is not attacked by any brazing flux either liquid or solid compositions, cold or fused. Fused brazing fluxes will not creep or penetrate under the coatings since the organosilicon oxide polymers are extremely adherent to the metals on which they are painted. Tests have indicated that the coatings are effective for their purpose at temperatures as high as 1500° F. and higher for the prolonged periods of time necessary to secure good brazing.

The above examples are only exemplary of the invention and are not intended to limit the scope thereof.

We claim as our invention:

1. In the method of applying molten soldering metal to selected areas of a member, the step comprising applying to the member at the edge of the selected areas without covering the selected areas a coating of a composition comprising as its essential ingredients a polymeric organosilicon oxide binder and a finely divided refractory inorganic substance in an amount equal to at least 25% of the weight of the organosilicon oxide, applying a soldering flux and solder to the selected areas outlined by the coating and heating the solder and soldering flux to a temperature sufficient to melt the solder, the coating preventing the flow of flux and solder beyond the areas so outlined.

2. In the method of soldering metal members the steps comprising applying to selected areas of the metal members a coating of a composition composed of a polymeric organosilicon oxide, a finely divided refractory inorganic substance in an amount of at least 25% of the weight of the organosilicon oxide and a readily volatile solvent, evaporating the solvent from the applied coating whereby a substantially dry coating of refractory inorganic material bonded by the organosilicon oxide polymer is adherently present on the metal members to define predetermined uncoated areas, assembling the members with the uncoated areas being adjacent to each other, applying to the predetermined areas a flux and soldering metal, and heating with a torch the solder and the flux to a temperature sufficient to melt the solder and thus accomplish the soldering of the members to one another within only the predetermined areas.

3. In the method of furnace brazing metal members, the steps comprising applying to selected areas of at least one of the metal members a coating of a composition composed of a polymeric organosilicon oxide, a finely divided refractory inorganic substance in an amount of at least 25% of the weight of the organosilicon oxide and a readily volatile solvent, evaporating the solvent from the applied coating whereby a substantially dry coating of refractory inorganic material bonded by the organosilicon oxide polymer is adherently present on the metal member to define a predetermined uncoated area, arranging the members in assembled position with the uncoated area adjacent the other member, applying to the predetermined area brazing metal and a flux, placing the treated metal members in a brazing furnace and applying thereto a temperature and an atmosphere sufficient to accomplish brazing of the assembly within only the predetermined area.

CHARLES H. JENNINGS.
EDWARD R. GAMBERG.

REFERENCES CITED

The following references are of record in the file of this patent:

UNITED STATES PATENTS

| Number | Name | Date |
|---|---|---|
| 2,027,932 | Ray | Jan. 14, 1936 |
| 2,115,127 | Smith | Apr. 26, 1938 |

FOREIGN PATENTS

| Number | Country | Date |
|---|---|---|
| 544,143 | Great Britain | Mar. 30, 1942 |